US006771477B2

(12) United States Patent
Milanczak

(10) Patent No.: US 6,771,477 B2
(45) Date of Patent: Aug. 3, 2004

(54) FUSED ELECTRICAL DISCONNECT DEVICE

(75) Inventor: Edwin Milanczak, Victoria Harbour (CA)

(73) Assignee: Canadian Shunt Industries Ltd., Ontario (CA)

( * ) Notice: Subject to any disclaimer, the term of this patent is extended or adjusted under 35 U.S.C. 154(b) by 339 days.

(21) Appl. No.: 09/725,335

(22) Filed: Nov. 29, 2000

(65) Prior Publication Data

US 2002/0064013 A1 May 30, 2002

(51) Int. Cl.$^{7}$ .................................................. H02H 5/00

(52) U.S. Cl. ....................... 361/104; 361/103; 361/115; 361/58

(58) Field of Search .......................... 361/23, 103, 104, 361/115, 58, 93.1

(56) References Cited

U.S. PATENT DOCUMENTS 4,222,627 A * 9/1980 Cox et al. ................... 439/622
4,543,557 A * 9/1985 Schaefer ..................... 337/196
D336,073 S 6/1993 Happ ........................ D13/161
D346,791 S 5/1994 Marach et al. ............. D13/160
D348,048 S 6/1994 Marach et al. ............. D13/160
5,355,274 A * 10/1994 Marach et al. .............. 361/104
D355,642 S 2/1995 Marach et al. ............. D13/160
D355,893 S 2/1995 Marach et al. ............. D13/160

* cited by examiner

*Primary Examiner*—Stephen W. Jackson
(74) *Attorney, Agent, or Firm*—Merchant & Gould, P.C.

(57) ABSTRACT

A fused electrical disconnect device comprises a housing and line and load connectors extending from one side of the housing. A line buss is disposed within the housing and is electrically connected to the line connector. A load buss is also disposed within the housing and is electrically connected to the load connector. A fuse holding cartridge is removably insertable into the housing. The fuse holding cartridge includes a body and line and load terminal blades extending from one side of the body. The line terminal blade contacts the line buss and the load terminal blade contacts the load buss when the fuse holding cartridge is inserted into the housing. A load protection fuse is removably insertable between the line and load terminal blades to establish an electrical current path between the line and load terminal blades.

62 Claims, 8 Drawing Sheets

FUSED ELECTRICAL DISCONNECT DEVICE

FIELD OF THE INVENTION

The present invention relates generally to low voltage, high current electrical power distribution systems, and more particularly to a fused electrical disconnect device for use in an electrical power distribution system.

BACKGROUND OF THE INVENTION

Power distribution systems, such as telephone switching offices in telecommunications systems are often constructed on a large scale to serve many customers. Since telephone communications are essential for most businesses, it is necessary to ensure that telecommunications systems of this nature are highly reliable. To keep telecommunications systems operational in the event of power interruptions, most telecommunications systems typically include a plurality of high-capacity storage batteries to provide electrical power for operating telecommunications equipment whenever power from the conventional power sources becomes unavailable.

In these telecommunications systems, batteries and power converters are usually connected together so that operating telecommunications equipment are supplied with power from a collection of sources. Notwithstanding this, it is desirable to be capable of isolating individual pieces of telecommunications equipment (or small groups thereof) from the power sources in order to perform maintenance and installation activities. It is also desirable to provide overload protection for telecommunications equipment on an individual basis.

Common overload protection devices for telecommunications equipment fall into two categories namely, fused electrical disconnect devices and circuit breakers. Fused electrical disconnect devices are typically connected to a power distribution panel interconnecting the power source supply buss and the load telecommunications equipment and include replaceable fuses that interrupt power when an overload or fault condition exists. When an overload or fault condition occurs and the fuse in the fused electrical disconnect device blows, the fuse must be removed from the fused electrical disconnect device and replaced before current flow to the telecommunications equipment can be resumed. Many variations of fused electrical disconnect devices exist. For example, a fused electrical disconnect device that includes an alarm fuse and a protection fuse is disclosed in U.S. Pat. No. 5,355,274 to Marach et al.

Circuit breakers typically include plug-in type connectors and are plugged into power distribution panels interconnecting load telecommunications equipment and the power source supply buss. Similar to fused electrical disconnect devices, circuit breakers also interrupt power when an overload or fault condition exists but can be manually reset to resume current flow to the telecommunications equipment without requiring the circuit breakers to be removed from the power distribution panels.

The connection interfaces and relative sizes of fused electrical disconnect devices and circuit breakers have, to-date, been radically different. As a result, it has not been possible to install circuit breakers in power distribution systems originally set up for use with fused electrical disconnect devices. The converse has also been true. Thus, switching the type of overload protection devices used in power distribution systems in the past has been costly and time consuming, making it impractical.

It is therefore an object of the present invention to provide a novel fused electrical disconnect device.

SUMMARY OF THE INVENTION

According to one aspect of the present invention there is provided a fused electrical disconnect device comprising:

- a housing;
- a line plug-in connector and a load plug-in connector, said line and load connectors extending from one side of said housing and being adapted to mate with complementary connectors in a power distribution panel; and
- a load protection fuse element removably insertable into said housing to establish an electrical current path between said line connector and said load connector.

In the preferred embodiment, the load protection fuse is carried by a fuse holding cartridge removably insertable into the housing. The fused electrical disconnect device further includes an alarm terminal extending from the housing. The alarm terminal is provided with an alarm signal when the electrical current path is interrupted. Preferably, the fuse holding cartridge also carries an alarm fuse. The alarm fuse provides the alarm signal to the alarm terminal when the load protection fuse fails to complete the electrical current path.

It is also preferred that the alarm signal is provided to the alarm terminal when the fuse holding cartridge is removed from the housing. Preferably, the housing accommodates a contact switch that electrically couples the line connector and the alarm terminal when the fuse holding cartridge is removed from the housing.

Preferably, the housing includes retaining notches therein to engage with retainers on the power distribution panel to inhibit the fused electrical disconnect device from being treated as a simple pull out connector. It is also preferred that the plug-in connectors are releasably secured to the housing to enable the fused electrical disconnect device to be wired to the power distribution panel in a conventional manner.

According to another aspect of the present invention there is provided a fused electrical disconnect device comprising:

- a compact housing;
- a line plug-in connector and a load plug-in connector, said line and load connectors extending from one side of said housing and being adapted to mate with complementary connectors in a power distribution panel;
- an alarm terminal extending from said housing and being positioned between said line and load connectors;
- a line conductive path within said housing and being electrically connected to said line connector;
- a load conductive path within said housing and being electrically connected to said load connector;
- a load protection fuse removeably insertable into said housing to complete an electrical current path between said line and load conductive paths; and
- an alarm fuse connected in parallel to said load protection fuse, said alarm fuse providing an alarm signal to said alarm terminal when said electrical current path is interrupted.

According to yet another aspect of the present invention there is provided a fused electrical disconnect device comprising:

a housing;

a line plug-in connector and a load plug-in connector, said line and load connectors extending from one side of said housing;

a line buss within said housing and being electrically connected to said line connector;

a load buss within said housing and being electrically connected to said load connector;

a fuse holding cartridge removably insertable into said housing, said fuse holding cartridge including:

a body;

line and load terminal blades extending from one side of said body, said line terminal blade contacting said line buss and said load terminal blade contacting said load buss when said fuse holding cartridge is inserted into said housing; and a load protection fuse removably insertable between said line and load terminal blades to establish an electrical current path between said line and load terminal blades; and a circuit within said housing to detect when said fuse holding cartridge is removed from said housing.

The present invention provides advantages in that the connection interface of the fused electrical disconnect device includes plug-in type connectors similar to those commonly used in circuit breakers. The plug-in type connectors allow the fused electrical disconnect device to be front mounted in a power distribution panel adapted to accommodate plug-in type connectors quickly and easily. This of course avoids having to wire the fused electrical disconnect device between the load device and the power source supply buss.

The present invention also provides advantages in that the fused electrical disconnect device generates an alarm signal whenever power to the load device is interrupted. Power interruption can be a result of a blown fuse within the fused electrical disconnect device or a removal of the fuse holding cartridge from the housing. Since the fused electrical disconnect provides an alarm signal when the fuse holding cartridge is removed from the device housing, situations where the fuse holding cartridge has been removed from the housing but not replaced can be detected.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
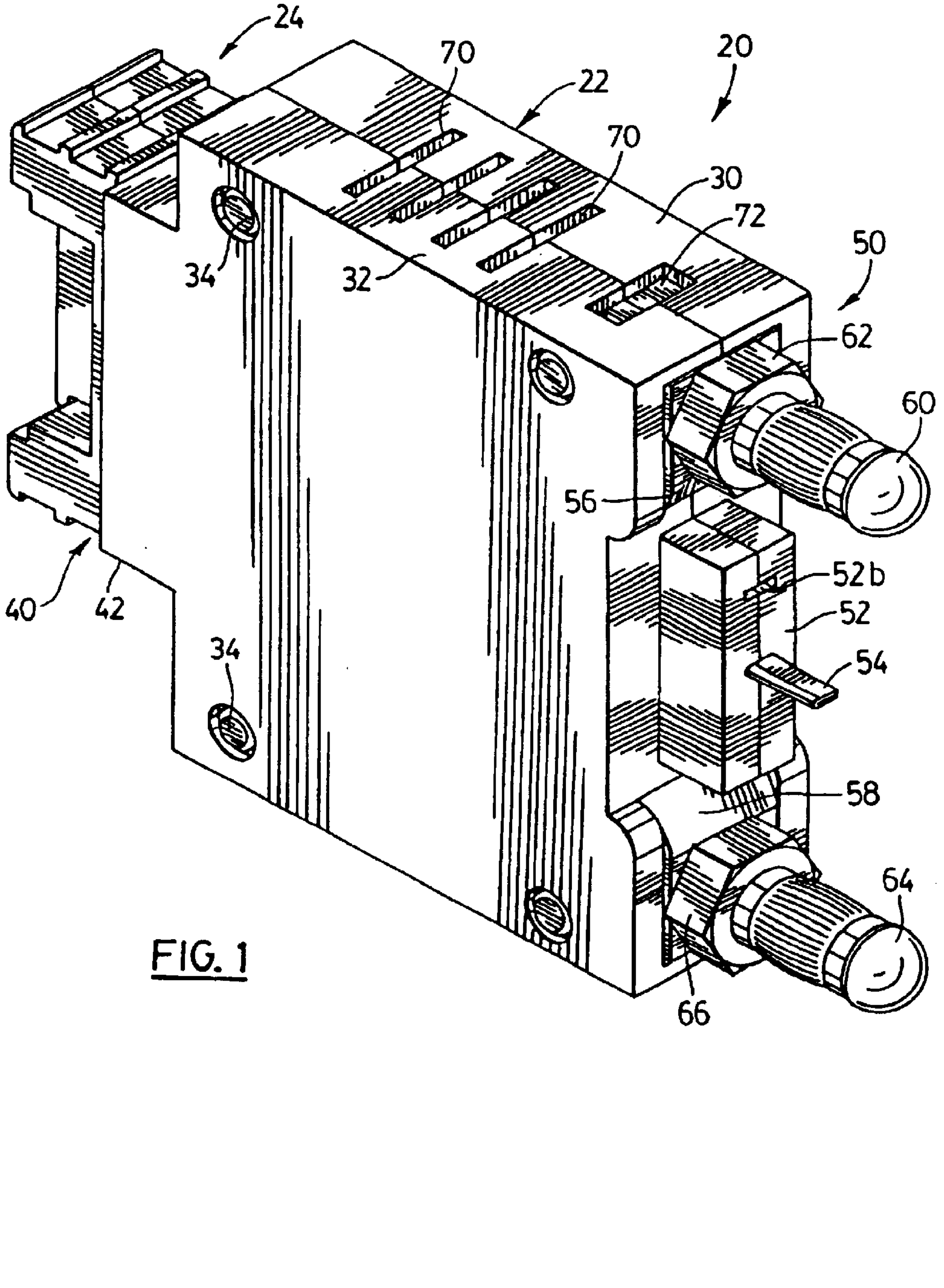
FIG. 1 is a perspective view of a fused electrical disconnect device in accordance with the present invention.
Figure 2:
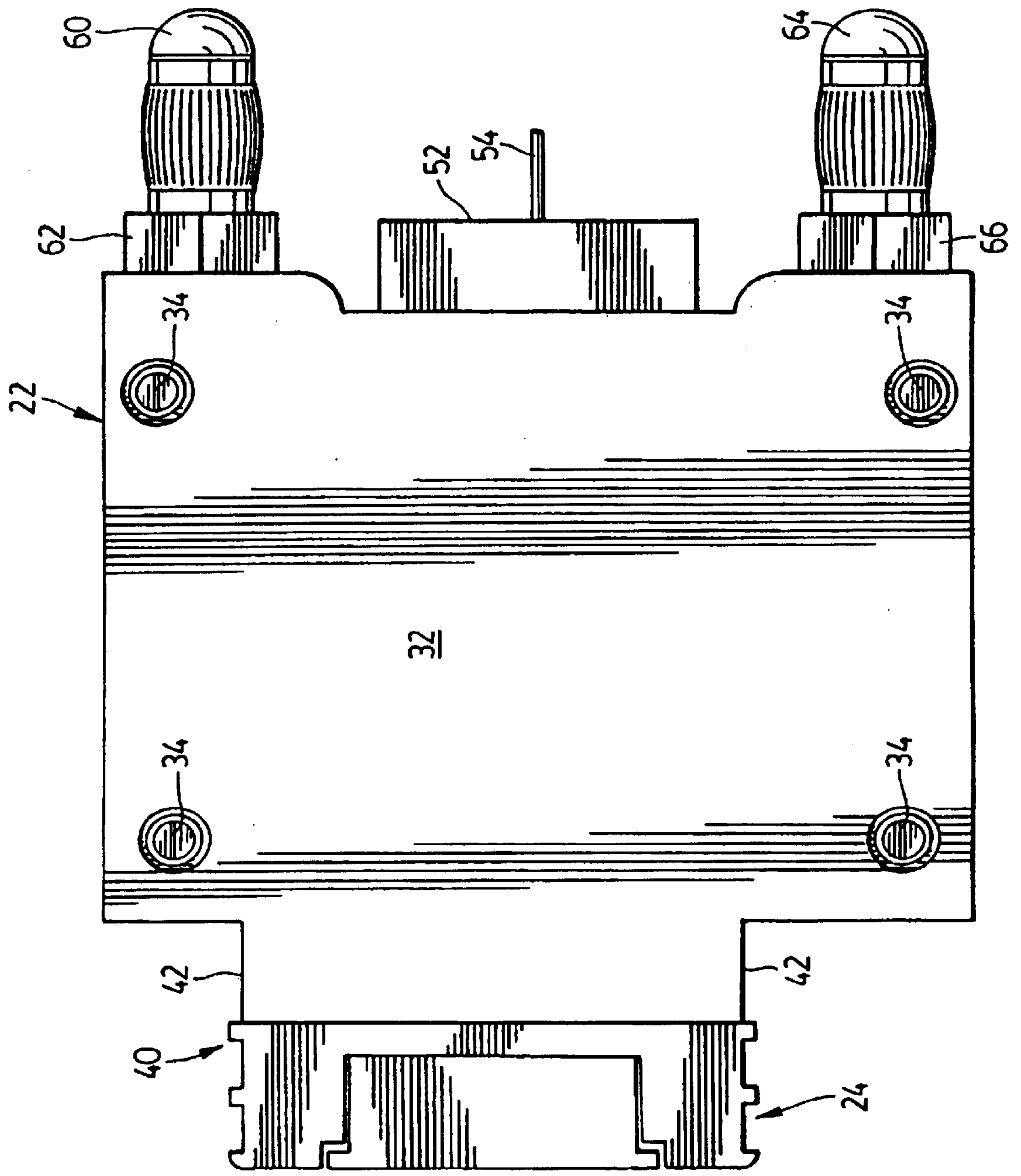
FIG. 2 is a side elevational view of the fused electrical disconnect device of FIG. 1.

Turning now to FIGS. 1 and 2, a fused electrical disconnect device in accordance with the present invention is shown and is generally indicated to by reference numeral 20. Fused electrical disconnect device 20 is designed to be plugged into a power distribution panel interconnecting a power source supply buss and a load device. The fused electrical interconnect device provides a fused conductive path for current flowing between the power source supply buss and the load device. If an overload or fault condition occurs and the current flowing through the fused electrical interconnect device exceeds its rating, current flow to the load device is interrupted and an alarm signal, signifying the overload or fault condition is generated. Specifics of the fused electrical disconnect device 20 will now be described.

As can be seen, in this embodiment fused electrical disconnect device 20 is compact and generally resembles a conventional circuit breaker. The fused electrical disconnect device 20 includes two main components, namely a fused electrical disconnect device housing 22 and a fuse holding cartridge 24 removably insertable into the housing 22.

Housing 22 includes a pair of plastic shell portions 30 and 32 respectively assembled and secured together by a plurality of fasteners 34 in the form of rivets. The housing 22 has a front fuse holding cartridge interface 40 including barrier walls 42 defining a rectangular opening 43 through which the fuse holding cartridge 24 is inserted. Threaded fasteners (not shown) pass through openings 46 in the front of the housing 22 on opposite sides of the rectangular cavity 43 and engage nuts 44 within the housing.

The housing 22 also has a connection interface 50 including a centrally disposed rectangular projection 52 having a pair of openings 52*a* and 52*b* provided therein. As is shown in FIG. 1, an alarm terminal 54 is inserted into the central opening 52*a*. Openings are provided in the rear of the housing 22 on opposite sides of the projection 52 to expose load side and line side busses 56 and 58 respectively. A load side plug-in type bullet connector 60 is releasably secured to the load side buss 56. Specifically, load side connector 60 threadably engages a nut 62 secured to the load side buss 56. A line side plug-in type bullet connector 64 is releasably secured to the line side buss 58. Line side connector 64 threadably engages a nut 66 secured to the line side buss 58. The load side and line side connectors 60 and 64 respectively are configured to mate with complimentary connectors in the power distribution panel.

Ventilation openings 70 are provided in the top and bottom walls of the housing 22 to facilitate airflow and inhibit overheating within the housing. Retaining notches 72 are also provided in the top and bottom walls of the housing 22. The retaining notches 72 accommodate spring clip retaining elements on the power distribution panel when the fused electrical disconnect device 20 is plugged into the power distribution panel. The spring clip retaining elements are designed to inhbit the fused electrical disconnect device 20 from being treated as a simple pull-out connector and pulled out of the power distribution panel while the fused electrical disconnect device is conducting current. This is desired due to the fact that high-amperage current typically flows through the fused electrical disconnect device. As will be appreciated, if the fused electrical disconnect device 20 is pulled from the power distribution panel while the fused electrical disconnect device is conducting current, arcing and possible injury to the individual removing the fused electrical disconnect may occur.

Figure 3:
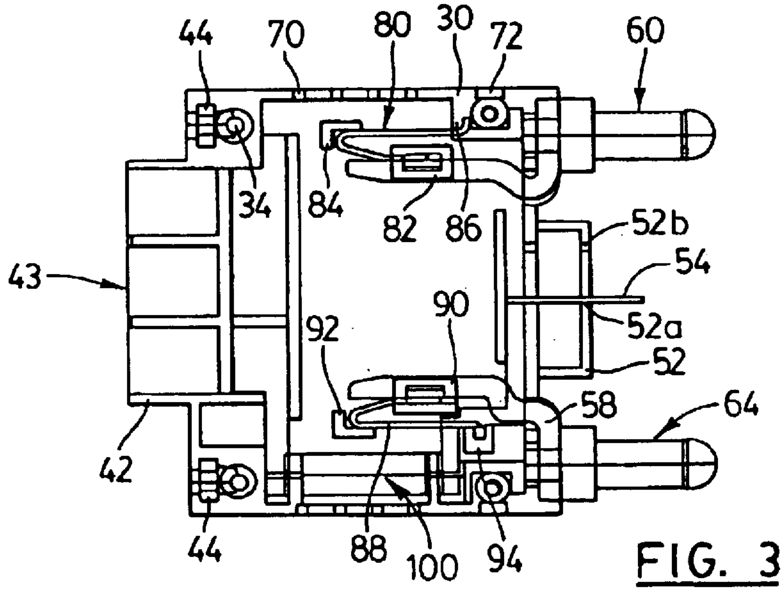
FIG. 3 is a side elevational view showing the interior of the fused electrical disconnect device housing.
Figure 4:
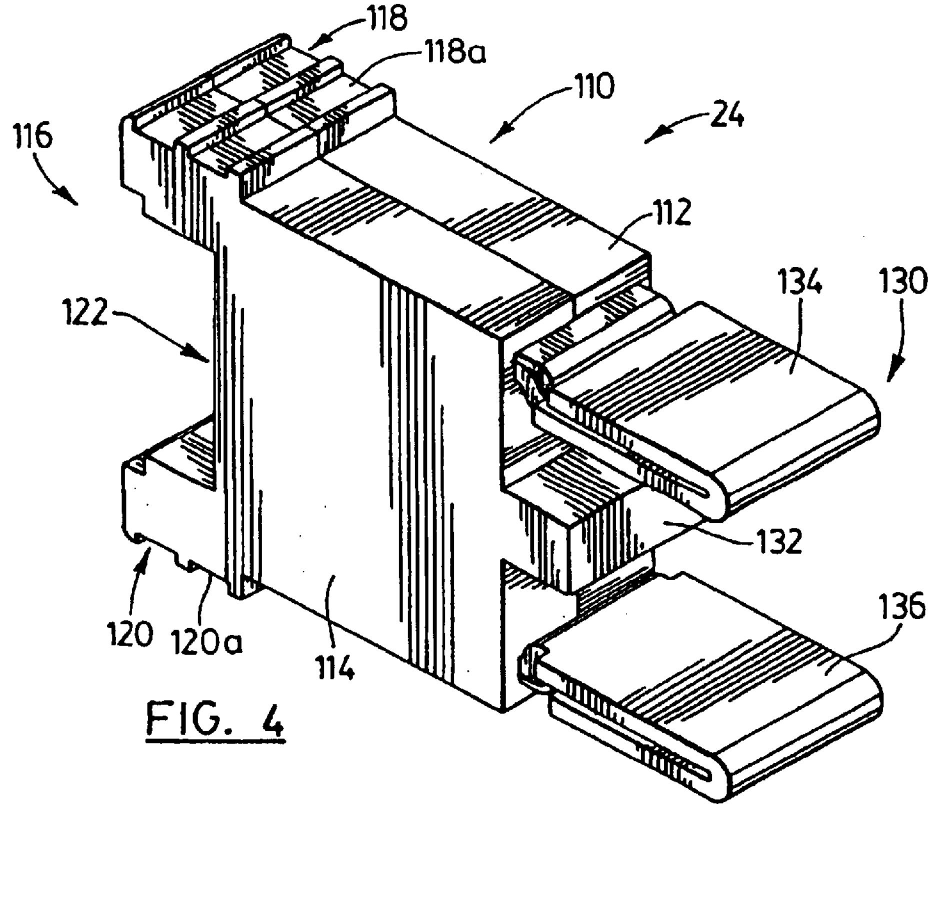
FIG. 4 is a perspective view of a fuse holding cartridge forming part of the fused electrical disconnect device of FIG. 1.
Figure 5:
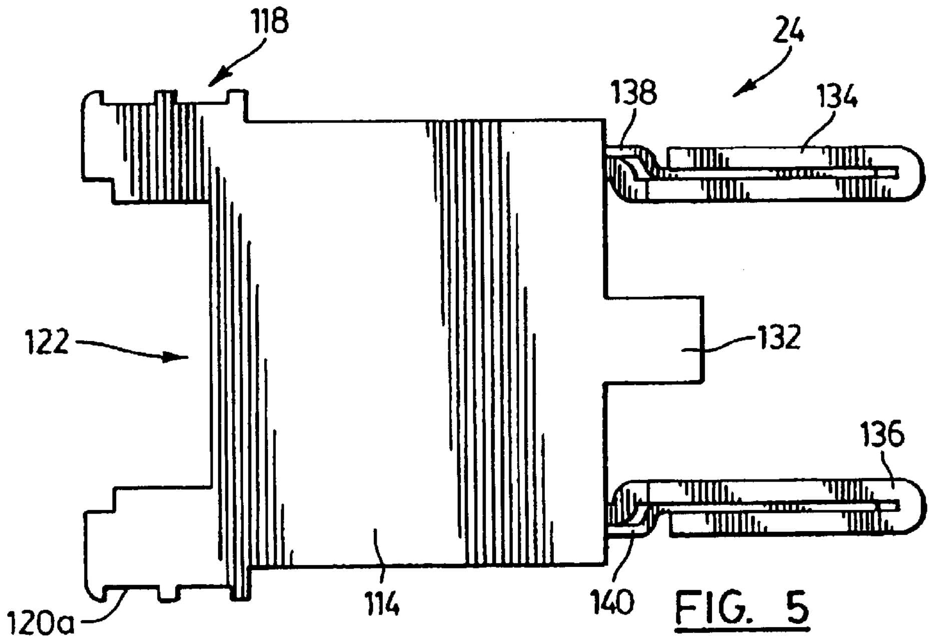
FIG. 5 is a side elevational view of the fuse holding cartridge of FIG. 4.
Figure 6:
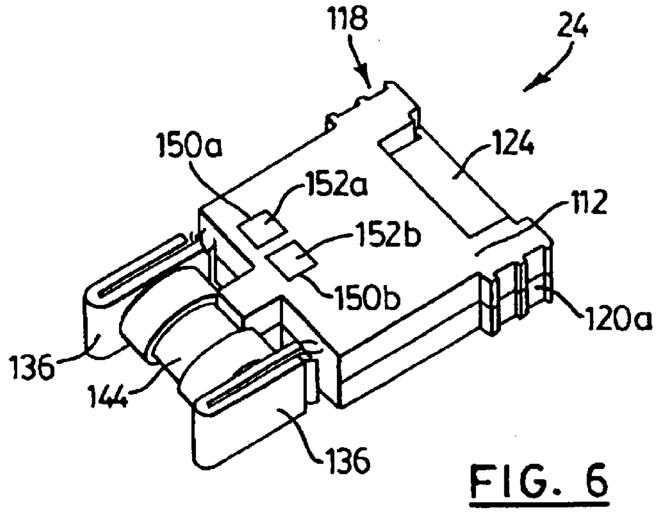
FIG. 6 is another perspective view of the fuse holding cartridge of FIG. 4 accommodating a load protection fuse and an alarm fuse.
Figure 10:
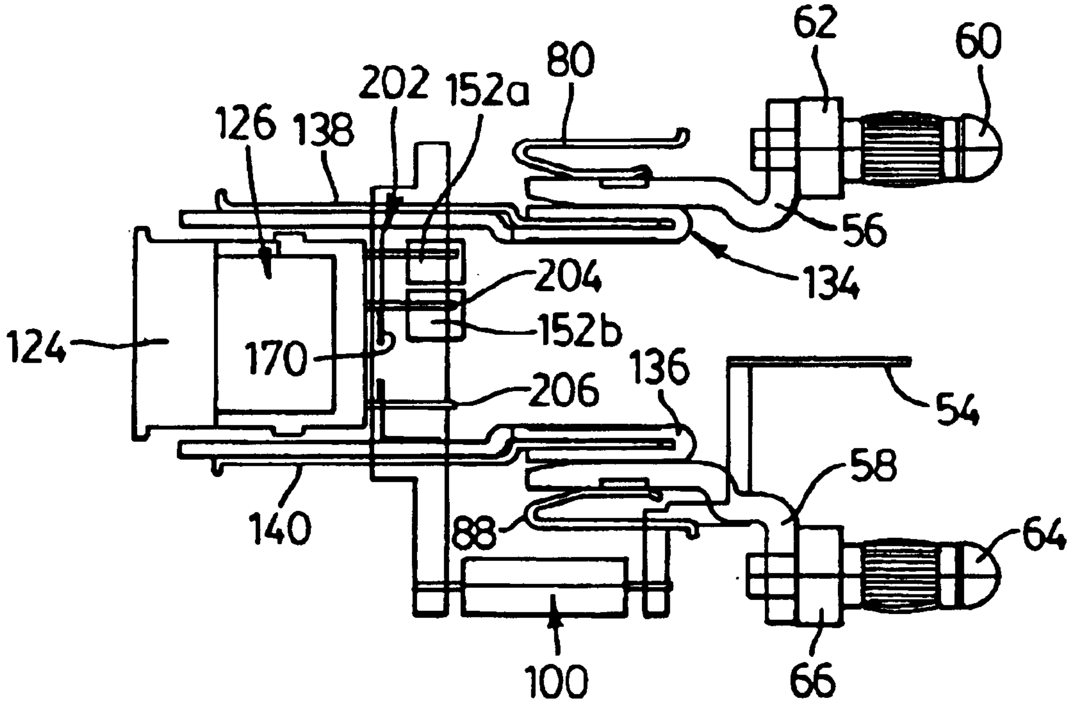
FIG. 10 is a side elevational view showing internal electrical connections within the fused electrical disconnect device of FIG. 1.
Figure 8:
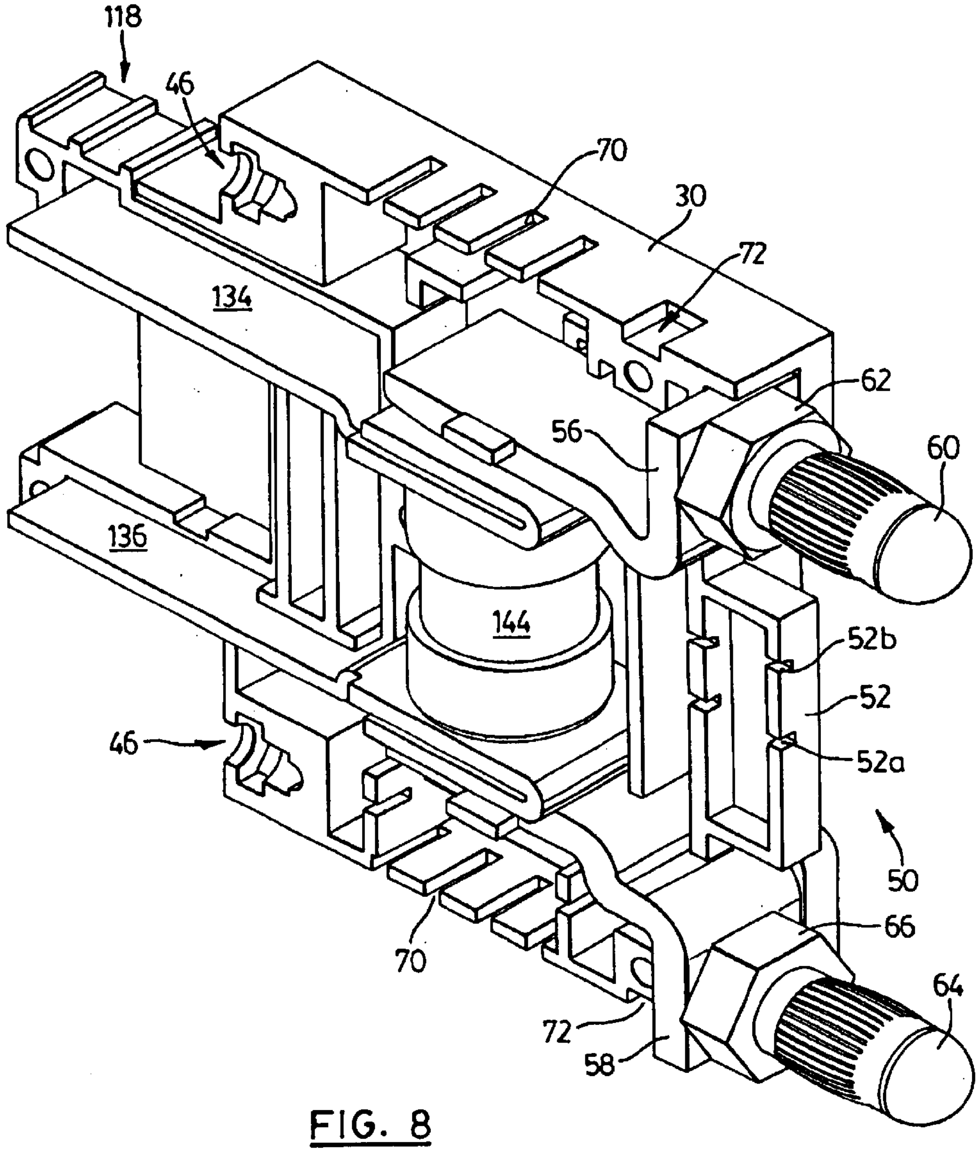
FIG. 8 is a perspective view showing the interiors of the fused electrical disconnect device housing and the fuse holding cartridge.

FIGS. 3, 8 and 10 better illustrate the interior of the housing 22. As can be seen, the load side buss 56 extends into the housing 22 near the top of the housing. A retaining spring 80 is secured at one end thereof to the load side buss 56 by a clip 82. The retaining spring 80 bears against interior walls 84 and 86 within the housing 22 and has a hooked end that is accommodated by a notch in the wall 86 to inhibit the load side buss 56 and connector 60 from being pulled out of the housing 22. The line side buss 58 extends into the housing 22 near the bottom of the housing. A retaining spring 88 is secured at one end thereof to the line side buss 58 by a clip 90. The retaining spring 88 bears against interior walls 92 and 94 within the housing 22 and has a hooked end that is accommodated by a notch in the wall 94 to inhibit the line side buss 58 and connector 64 from being pulled out of the housing 22. A current limiting resistor 100 is disposed in the housing 22 below the line side buss 58 and forms part of an alarm signal circuit as will described.

The fuse holding cartridge is 24 best illustrated in FIGS. 4 to 7. As can be seen, the fuse holding cartridge 24 includes a body 110 constituted by a pair of plastic shell portions 112 and 114 assembled and secured together. The body 110 has a front alarm fuse interface 116 including a pair of vertically spaced, forwardly projecting, upper and lower tabs 118 and 120 respectively. The upper surface 118*a* of the upper tab 118 and the lower surface 120*a* of the lower tab 120 are ribbed to facilitate grasping and hence, the insertion and removal of the fuse holding cartridge 24 into and from the housing 22. An opening 122 is provided in the front alarm fuse interface 116 between the tabs 118 and 120 and accommodates an alarm fuse holder 126. An alarm fuse 124 is removably insertable into the alarm fuse holder 126.

The body 110 also has a connection interface 130 including a rectangular projection 132 disposed generally centrally between rearwardly extending load and line terminal blades 134 and 136 respectively. The end of the load terminal blade 134 is folded over itself to trap a thin retaining element 138 therebetween. Similarly, the end of the line terminal blade 136 is folded over itself to trap a thin retaining element 140 therebetween. A cylindrical load protection cartridge fuse 144 is positioned between the load and line terminal blades 134 and 136 and contacts the load and line terminal blades to complete an electrical current path between the load and line terminal blades. The rectangular projection 132 helps to center the load protection cartridge fuse 144 between the load and line terminal blades 134 and 136. A pair of openings 150*a* and 150*b* are provided in one side of the body 110 to expose alarm signal contacts 152*a* and 152*b* respectively. Alarm signal contacts 152*a* and 152*b* communicate with the alarm signal circuit as will be described.

Figure 7:
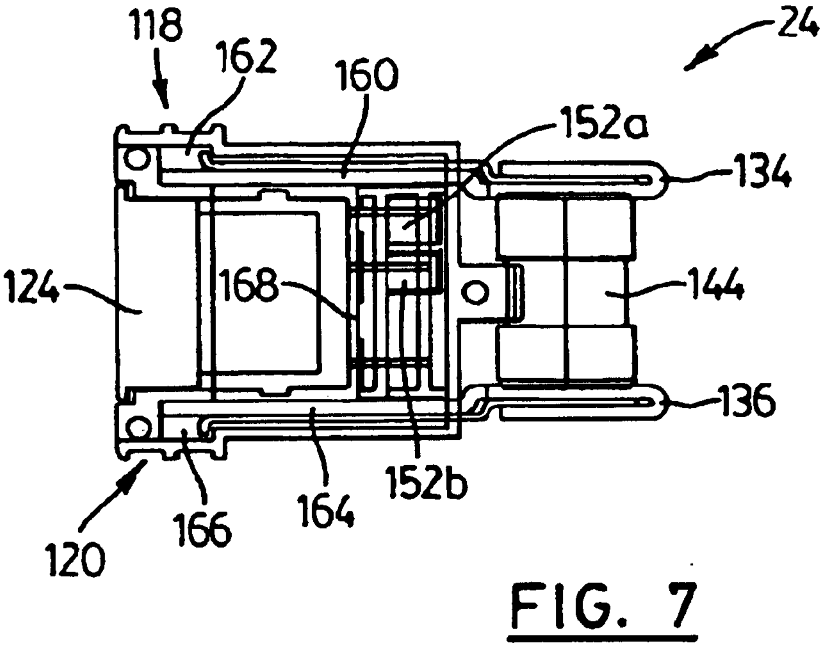
FIG. 7 is a side elevational view showing the interior of the fuse holding cartridge of FIG. 4.

Turning now to FIGS. 7 and 10, the interior of the fuse holding cartridge 24 is better illustrated. As can be seen, the load terminal blade 134 extends into the body 110 and sits on an internal wall 160 above the alarm fuse holder 126. The retaining element 138 also extends into the body 110 above the load terminal blade 134 and has a hooked distal end that is accommodated by a notch 162 defined by the upper tab 118 thereby to inhibit removal of the load terminal blade 134 from the body 110. Similarly, the line terminal blade 136 extends into the body 110 and sits on an internal wall 164 below the alarm fuse 126. The retaining element 140 also extends into the body 110 below the line terminal blade 136 and has a hooked distal end that is accommodated by a notch 166 defined by the lower tab 120 thereby to inhibit removal of the line terminal blade 136 from the body 122. An internal vertical wall 168 spans the ends of the internal walls 160 and 164 and defines a stop for the alarm fuse holder 126. The vertical wall 168 has passages therein to allow pins of the alarm fuse 124 to pass.

The alarm fuse 124 is preferably of the type manufactured by San-O Industries Company and includes a plastic rectangular body 200 housing a fusible element (not shown). Three vertically spaced pins 202, 204 and 206 respectively extend from the rear of the body 200. When the alarm fuse 124 is inserted into alarm fuse holder 126, the upper pin 202 passes through a passage in the vertical wall 168 and contacts the alarm signal contact 152*a*. The bottom pin 206 passes through a passage in the vertical wall 168 and contacts a stamped conductor 208 in electrical communication with the load terminal blade 134. The intermediate pin 204 passes through a passage in the vertical wall 168 and contacts the alarm signal contact 152*b*. In its initial conducting state, pins 204 and 206 are internally connected by the fusible element. In this manner, the alarm fuse 124 provides a current carrying path between the line connector 64 and load connector 60 that is in parallel with the load protection fuse 144.

Figure 9:
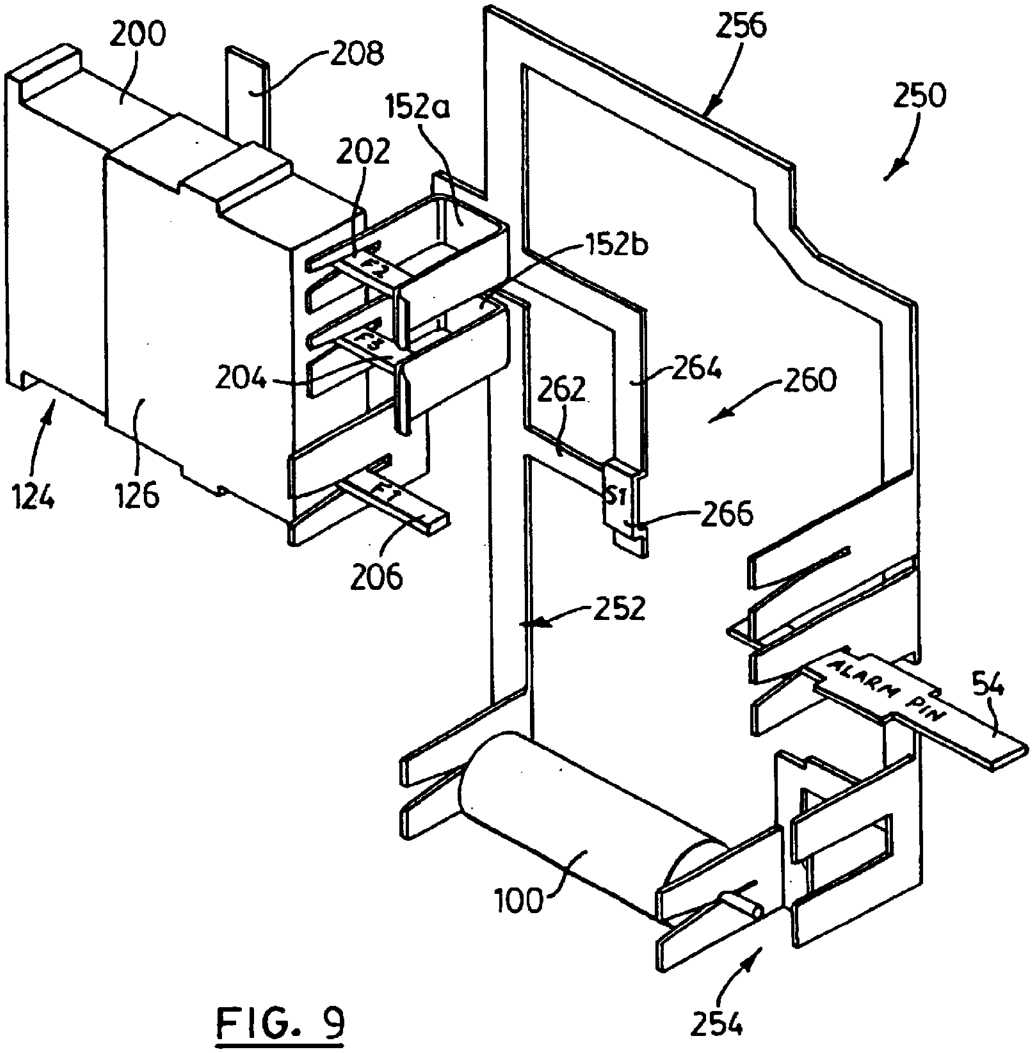
FIG. 9 is a perspective view showing internal electrical connections within the fused electrical disconnect device of FIG. 1.

Turning now to FIG. 9, the alarm signal circuit 250 is illustrated. As can be seen, alarm signal circuit 250 includes a conductive element 252 having one end in electrical communication with one terminal of the current limiting resistor 100. The other terminal of current limiting resistor 100 is electrically coupled to the line side buss 58 via conductive element 254. The other end of conductive element is 252 positioned to come into sliding contact with the alarm signal contact 152*b*. Alarm signal contact circuit 250 also includes a conductive element 256 having one end in electrical communication with the alarm terminal 54. The other end of the conductive element 256 is positioned to come into sliding contact with the alarm signal contact 152*a*. A fuse holding cartridge detect contact switch 260 interconnects the conductive elements 252 and 256 respectively.

As can be seen, contact switch 260 includes a conductive arm 262 extending outwardly from the conductive element 252 at right angles. An L-shaped conductive arm 264 extends outwardly from conductive element 256 and has a step 266 formed therealong adjacent the end of the conductive arm 264. The conductive arm 262 is resilient and is angled inwardly towards the step 266 to make contact with the step and complete an electrical path between the conductive arms 262 and 264 respectively. When the fuse holding cartridge 24 is inserted into the housing 22, the fuse holding cartridge 24 urges the conductive arm 262 away from the step 266 to open the contact switch 260.

Figure 11:
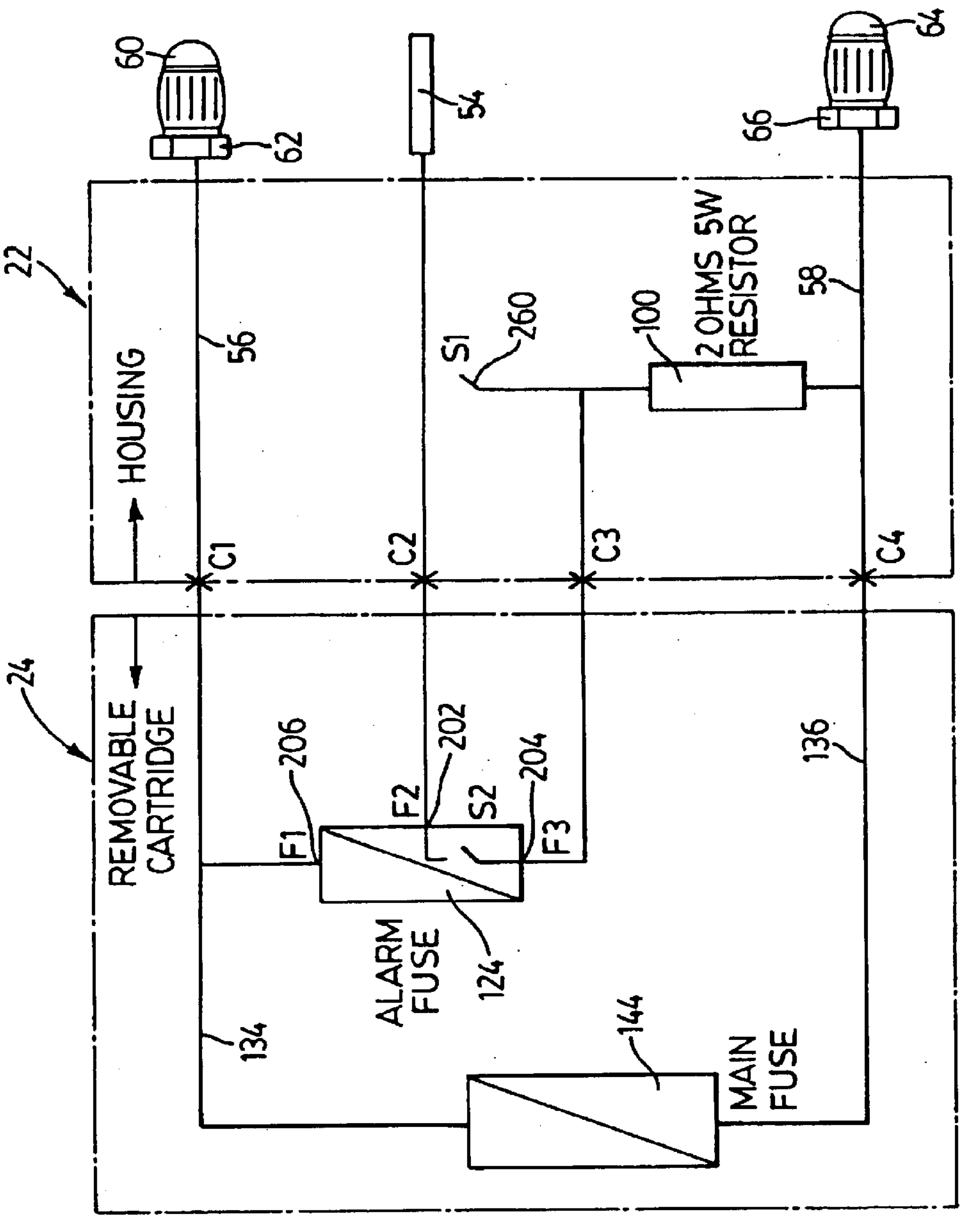
FIG. 11 is an internal electrical schematic of the fused electrical disconnect device of FIG. 1.

FIG. 11 shows an electrical schematic of the fused electrical disconnect device 20 with the fuse holding cartridge 24 inserted into the housing 22 and loaded with alarm and load protection fuses 124 and 144 respectively. As can be seen, the load protection fuse 144 completes an electrical current path between the load terminal blade 134 and the line terminal blade 136 and hence, between the load connector 60 and line connector 64. The alarm fuse 124 is in parallel with the load protection fuse 144 and is electrically connected to the load terminal blade 134 via conductor 208, the alarm terminal 54 via contact 152*a* and conductive element 256 and the line side buss 58 via current limiting resistor 100 and conductive elements 252 and 254 respectively.

In typical operation, the fused electrical disconnect device 20 is plugged into the power distribution panel so that the load connector 60 is connected to a non-faulty load device and the line connector 64 is connected to the power source supply buss. Assuming that the load protection fuse 144 and the alarm fuse 124 are in their initial conducting states, current flows between the line and load connectors via the line and load terminal blades and busses and the load protection fuse 144. Although the alarm fuse 124 is also connected across the line and connectors 60 and 64, in parallel with the load protection fuse 144, the alarm fuse 124 remains in tact due to the fact that only a small portion of the current flows through the alarm fuse.

If a fault or overload condition occurs in the load device or on the load side, excess current flows through the load protection fuse 144 causing the load protection fuse to interrupt current flow between the load and line terminal blades 134 and 136. Since the alarm fuse 124 is connected in parallel with the load protection fuse 144, when the current flow through the load protection fuse 144 is interrupted, the entire load current flows through the alarm fuse 124 via the current limiting resistor 100. Because the alarm fuse has a relatively low current carrying capacity, the fusible element in the alarm fuse 124 melts or breaks virtually immediately in response to the significant increase in current. This results in the line connector 64 becoming electrically isolated from the load connector 60. When the fusible element breaks or melts, pins 202 and 204 become internally connected. As a result, the alarm fuse 124 electrically connects the alarm terminal 54 to the line connector 64 via the conductive elements 252, 254 and 256 and the current limiting resistor 100. This provides an alarm signal to the alarm terminal 54. The alarm terminal may of course be connected to a suitable remote monitoring or indication device thereby to allow the overload condition to be remotely detected.

The fuse holding cartridge 24 can be easily removed from the housing 22 by grasping the tabs 118 and 120 and pulling the fuse holding cartridge out of the housing. The ribbing on the tabs facilitates grasping of the fuse holding cartridge. Once the fuse holding cartridge 24 has been removed from the housing 22, the spent load protection fuse 144 and the spent alarm fuse 124 can be replaced with new fuses. The fuse holding cartridge 24 can then be re-inserted into the housing 22 through the opening 43. As the fuse holding cartridge is inserted into the housing 22, the line and load terminal blades move into sliding contact with the line and load busses to re-complete the electrical current path between the load connector 60 and the line connector 64.

When the fuse holding cartridge 24 is removed from the housing 22, the conductive arm 262 moves back into contact with the step 266 to close the contact switch 260 thereby connecting the line connector 64 to the alarm terminal 54 via the conductive elements, 252, 254 and 256 and the current limiting resistor 100. As a result, an alarm signal is provided on the alarm terminal 54. This allows situations where a fuse holding cartridge 24 is removed from the housing 22 but not replaced to be detected.

Although the shell portions 30 and 32 of the housing 22 have been described as being secured together by rivet fasteners 34, those of skill in the art will appreciate that other fastening methods such as ultrasonic welding may be used. Also, although the drawings show the alarm terminal 54 in the central opening 52*a*, the alarm terminal 54 may be inserted into the other opening 52*b* so that it is positioned closer to the load connector 60. Of course, both openings need not be provided in the projection 52. A single opening at either position may be provided in the projection to accommodate the alarm terminal 54.

As will be appreciated, the present fused electrical disconnect device is compact and since it resembles a circuit breaker, a single power distribution panel design can be used to accommodate both circuit breakers and fused electrical disconnect devices. The fused electrical disconnect device provides alarm signals in the event of an overload or fault condition as well as when the fuse holding catridge has been removed from the housing but not replaced.

If desired, the fused electrical disconnect device can be wired to the power supply buss and the load device in a conventional manner by removing the plug-in type connectors from the line and load side busses.

Although a preferred embodiment of the present invention has been described, those of skill in the art will appreciate that variations and modifications may be made without departing from the spirit and scope thereof as defined by the appended claims.

What is claimed is:

1. A fused electrical disconnect device comprising:

a housing;

a line plug-in connector and a load plug-in connector, said line and load connectors extending from one side of said housing and being adapted to mate with complementary connectors in a power distribution panel;

a fuse holding cartridge removably insertable into said housing, said fuse holding cartridge removably accommodating a load protection fuse, said load protection fuse establishing an electrical current path between said line connector and said load connector; and an alarm terminal extending from said housing, said alarm terminal being provided with an alarm signal when said electrical current path is interrupted as a result of removal of said fuse holding cartridge from said housing.

2. A fused electrical disconnect device as defined in claim 1 wherein said fuse holding cartridge also carries an alarm fuse, said alarm fuse providing an alarm signal to said alarm terminal when said load protection fuse fails to complete said electrical current path.

3. A fused electrical disconnect device as defined in claim 2 wherein said fuse holding cartridge includes a pair of spaced tabs, said tabs extending beyond said housing when said fuse holding cartridge is inserted into said housing, said alarm fuse being removably insertable into said fuse holding cartridge via an opening positioned between said tabs.

4. A fused electrical disconnect device as defined in claim 1 wherein said housing includes retaining notches therein to engage retainers on said power distribution panel.

5. A fused electrical disconnect device as defined in claim 1 wherein said plug-in connectors are releasably secured to said housing.

6. A fused electrical disconnect device as defined in claim 1 wherein said housing accommodates a contact switch, said contact switch electrically coupling said line connector and said alarm terminal when said fuse holding cartridge is removed from said housing thereby to provide said alarm terminal with said alarm signal.

7. A fused electrical disconnect device as defined in claim 2 wherein said housing accommodates a contact switch, said contact switch electrically coupling said line connector and said alarm terminal, when said fuse holding cartridge is removed from said housing thereby to provide said alarm terminal with said alarm signal.

8. A fused electrical disconnect device comprising:

a compact housing;

a line plug-in connector and a load plug-in connector, said line and load connectors extending from one side of said housing;

an alarm terminal extending from said housing;

a line conductive path within said housing and being electrically connected to said line connector;

a load conductive path within said housing and being electrically connected to said load connector;

a fuse holding cartridge removably insertable into said housing and including a pair of spaced conductive blades to abut said line conducting path and said load conducting path when said fuse holding cartridge is inserted into said housing;

a load protection fuse removeably insertable between said blades exterior of the body of said fuse holding cartridge to complete an electrical current path between said line and load conductive paths; and an alarm fuse connected in parallel to said load protection fuse, said alarm fuse providing an alarm signal to said alarm terminal when said electrical current path is interrupted.

9. A fused electrical disconnect device as defined in claim 8 wherein said alarm fuse is also accommodated by said fuse holding cartridge, said fuse holding cartridge being removably insertable into said housing via an opening in the side of the housing opposite to said one side.

10. A fused electrical disconnect device as defined in claim 9 wherein said blades move into sliding contact with said line and load conductive paths when said fuse holding cartridge is inserted into said housing.

11. A fused electrical disconnect device as defined in claim 10 wherein said fuse holding cartridge includes a projection disposed between said blades to center generally the load protection fuse relative to said blades.

12. A fused electrical disconnect device as defined in claim 10 wherein said fuse holding cartridge further includes a pair of spaced tabs, said tabs extending beyond said housing when said fuse holding cartridge is inserted into said housing, said alarm fuse being removably insertable into said fuse holding cartridge via an opening positioned between said tabs.

13. A fused electrical disconnect device as defined in claim 8 wherein said housing includes retaining notches therein.

14. A fused electrical disconnect device as defined in claim 8 further including a contact switch within said housing, said contact switch electrically coupling said line connector and said alarm terminal to provide a n alarm signal thereon when said fuse holding cartridge is removed from said housing.

15. A fused electrical disconnect device as defined in claim 8 wherein said plug-in connectors are releasably secured to said housing.

16. A fused electrical disconnect device comprising:

a housing;

a line plug-in connector and a load plug-in connector, said line and load connectors extending from one side of said housing;

a line buss within said housing and being electrically connected to said line connector;

a load buss within said housing and being electrically connected to said load connector;

a fuse holding cartridge removably insertable into said housing, said fuse holding cartridge including:

a body;

line and load terminal blades extending from one side of said body, said line terminal blade contacting said line buss and said load terminal blade contacting said load buss when said fuse holding cartridge is inserted into said housing; and a load protection fuse removably insertable between said line and load terminal blades to establish an electrical current path between said line and load terminal blades; and a circuit within said housing to detect when said fuse holding cartridge is removed from said housing.

17. A fused electrical disconnect device as defined in claim 16 further including an alarm terminal extending from said housing, said alarm terminal being supplied with an alarm signal by said circuit when said fuse holding cartridge is removed from said housing.

18. A fused electrical disconnect device as defined in claim 17 wherein said circuit electrically couples said line connector to said alarm terminal when said fuse holding cartridge is removed from said housing.

19. A fused electrical disconnect device as defined in claim 18 further including an alarm fuse connected in parallel to said load protection fuse, said alarm fuse providing an alarm signal to said alarm terminal when said electrical current path is interrupted.

20. A fused electrical disconnect device as defined in claim 19 wherein said alarm fuse is accommodated by said body.

21. A fused electrical disconnect device as defined in claim 20 wherein said alarm fuse is removeably insertable into said body.

22. A fused electrical disconnect device as defined in claim 21 wherein said fuse holding cartridge further includes a pair of spaced tabs, said tabs extending beyond said housing when said fuse holding cartridge is inserted into said housing, each tab having a ribbed outer surface to facilitate grasping.

23. A fused electrical disconnect device as defined in claim 17 wherein said housing includes retaining notches therein.

24. A fused electrical disconnect device as defined in claim 17 wherein said plug-in connectors are releasably secured to said housing.

25. A fused disconnect switch comprising:

at least one housing assembly comprising a fuse receptacle and first and second terminal contact assemblies extending therefrom, at least one of said first and second contact assemblies comprising a bullet contact assembly;

a retractable fuse comprising a housing, and a primary fuse link within said housing; and a retractable fuse detection device within said at least one housing assembly.

26. A fused disconnect switch in accordance with claim 25 wherein both of said first and second terminal contact assemblies comprise a bullet contact assembly.

27. A fused disconnect switch in accordance with claim 25 further comprising an alarm fuse link received in said fuse receptacle, said primary and alarm fuse links connected in parallel.

28. A fused disconnect switch comprising:

a switch housing comprising a fuse receptacle, a line-side contact extending from said fuse receptacle, and a load-side contact assembly extending from said fuse receptacle; and a retractable fuse comprising a housing, a line-side blade, a load-side blade and a primary fuse link extending between said line-side blade and said load-side blade exterior of said housing, said line-side blade and load-side blade being in slinding contact and abutting said line-side and load-side contact assemblies.

29. A fused disconnect switch in accordance with claim 28, wherein said line-side contact assembly and said load-side contact assembly comprise a bullet contact assembly.

30. A fused electrical disconnect device as defined in claim 6 wherein said contact switch includes a resilient conductive element coupling said line connector and said alarm terminal when said fuse holding cartridge is removed from said housing.

31. A fused electrical disconnect device as defined in claim 30 wherein said contact switch is biased out of contact with said alarm terminal when said fuse holding cartridge is inserted into said housing.

32. A fused electrical disconnect device as defined in claim 7 wherein said contact switch includes a resilient conductive element coupling said line connector and said alarm terminal when said fuse holding cartridge is removed from said housing.

33. A fused electrical disconnect device as defined in claim 32 wherein said contact switch is biased out of contact with said alarm terminal when said fuse holding cartridge is inserted into said housing.

34. A fused electrical disconnect device as defined in claim 1 wherein said load protection fuse extends between a pair of conductive blades on said fuse holding cartridge, said blades being in conductive contact with said line and load connectors when said fuse holding cartridge is inserted into said housing.

35. A fused electrical disconnect device as defined in claim 34 wherein said fuse holding cartridge includes a centering projection disposed between said blades to position said load protection fuse.

36. A fused electrical disconnect device as defined in claim 1 wherein said housing includes ventilaiton openings therein.

37. A fused electrical disconnect device as defined in claim 1 wherein said housing includes multiple sets of slots to accommodate said alarm terminal thereby to enable the position of said alarm terminal to be adjusted.

38. A fused electrical disconnect device as defined in claim 14 wherein said contact switch includes a resilient conductive element coupling said line connector and said alarm terminal when said fuse holding cartridge is removed from said housing.

39. A fused electrical disconnect device as defined in claim 38 wherein said contact switch is biased out of contact with said alarm terminal when said fuse holding cartridge is inserted into said housing.

40. A fused electrical disconnect device as defined in claim 8 wherein said housing includes ventilation openings therein.

41. A fused electrical disconnect device as defined in claim 8 wherein said housing includes multiple sets of slots to accommodate said alarm terminal thereby to enable the position of said alarm terminal to be adjusted.

42. A fused electrical disconnect device as defined in claim 18 wherein said contact switch includes a resilient conductive element coupling said line connector and said alarm terminal when said fuse holding cartridge is removed from said housing.

43. A fused electrical disconnect device as defined in claim 42 wherein said contact switch is biased out of contact with said alarm terminal when said fuse holding cartridge is inserted into said housing.

44. A fused electrical disconnect device as defined in claim 16 wherein said housed includes ventilation openings therein.

45. A fused electrical disconnect device as defined in claim 16 wherein said housing includes multiple sets of slots to accommodate said alarm terminal thereby to enable the position of said alarm terminal to be adjusted.

46. A fused electrical disconnect device as defined in claim 18 wherein said line and load terminal blades move into sliding contact with and abut said line and load busses when said fuse holding cartridge is inserted into said housing.

47. A fused disconnect switch in accordance with claim 25 wherein said retractable fuse detection device is a contact switch.

48. A fused disconnect switch in accordance with claim 47 wherein said contact switch is biased to an open condition by said retractable fuse and moves to a closed condition when said retractable fuse is remove from said at least one housing assembly.

49. A fused disconnect switch in accordance with claim 48 wherein said at least one housing assembly includes an alarm terminal, said contact switch providing an alarm signal on said alarm terminal when said contact switch is in said closed condition.

50. A fused disconnect switch in accordance with claim 27 wherein said retractable fuse detection device is a contact switch.

51. A fused disconnect switch in accordance with claim 50 wherein said contact switch is biased to an open condition by said retractable fuse and moves to a close condition when said retractable fuse is removed from said at least one housing assembly.

52. A fused disconnect switch in accordance with claim 51 wherein said at least one housing assembly includes an alarm terminal, said contact switch providing an alarm signal on said alarm terminal when said contact switch is in said closed condition.

53. A fused disconnect switch in accordance with claim 52 wherein said retractable fuse provides an alarm signal on said alarm terminal when said primary fuse link fails.

54. A fused disconnect switch comprising:

a housing including line-side and load-side bullet contacts terminals and defining a fuse cartridge receptacle; and a removable fuse cartridge including a housing and a pair of blades extending from said housing between which a primary fuse extends, said blades being in electrical contact with said line-side and load-side bullet contact terminals.

55. A fused disconnect switch in accordance with claim 54 further comprising a projection on said fuse cartridge housing between said blades to position said primary fuse.

56. A fused disconnect switch in accordance with claim 55 wherein said fuse cartridge housing accommodates an alarm fuse in parallel with said primary fuse.

57. A fused disconnect switch in accordance with claims 56 further comprising an alarm terminal on said housing, said alarm terminal being provided with an alarm signal upon failure of said primary fuse.

58. A fused disconnect switch in accordance with claim 57 further including a fuse cartridge detection circuit providing an alarm signal on said alarm terminal upon removal of said fuse cartridge from said housing.

59. A fused disconnect switch comprising:

a housing including line-side and load-side bullet contact terminals and defining a fuse cartridge receptacle;

a removable fuse cartridge accommodating a primary fuse; and a contact switch in said housing detecting the presence of said fuse cartridge.

60. A fused disconnect switch in accordance with claim 59 wherein said fuse cartridge also accommodates an alarm fuse in parallel with said primary fuse.

61. A fused disconnect switch in accordance with claims 60 further comprising an alarm terminal on said housing, said alarm terminal being provided with an alarm signal upon failure of said primary fuse.

62. A fused disconnect switch in accordance with claim 61 wherein said contact switch provides an alarm signal on said alarm terminal when said fuse cartridge is removed from said housing.

* * * * *